(12) United States Patent
Teh et al.

(10) Patent No.: US 8,610,412 B2
(45) Date of Patent: Dec. 17, 2013

(54) CONTROLLERS, SYSTEMS AND METHODS FOR IMPLEMENTING MULTI-PHASE CONTROL

(75) Inventors: ChengHwa Teh, The Rivervale (SG); Laszlo Lipcsei, Campbell, CA (US); Serban Mihai Popescu, San Carlos, CA (US)

(73) Assignee: O2Micro Inc., Santa Clara, CA (US)

( * ) Notice: Subject to any disclaimer, the term of this patent is extended or adjusted under 35 U.S.C. 154(b) by 460 days.

(21) Appl. No.: 13/031,005

(22) Filed: Feb. 18, 2011

(65) Prior Publication Data

US 2011/0254520 A1 Oct. 20, 2011

Related U.S. Application Data

(60) Provisional application No. 61/324,838, filed on Apr. 16, 2010.

(51) Int. Cl.
*G05F 1/40* (2006.01)
(52) U.S. Cl.
USPC ............................................ 323/271; 363/65

(58) Field of Classification Search
USPC ........ 363/65, 67, 69; 323/267, 268, 271, 272, 323/282, 285
See application file for complete search history.

(56) References Cited

U.S. PATENT DOCUMENTS

| | | | |
|---|---|---|---|
| 6,490,282 B1 * | 12/2002 | Ikematsu | .................... 370/395.1 |
| 7,023,188 B1 | 4/2006 | Rice | |
| 7,477,084 B2 | 1/2009 | Rice | |
| 7,847,532 B2 * | 12/2010 | Potter et al. | ..................... 323/283 |
| 2006/0120121 A1 * | 6/2006 | Chang et al. | ..................... 363/71 |
| 2010/0079088 A1 * | 4/2010 | Lipcsei et al. | ................. 315/297 |

FOREIGN PATENT DOCUMENTS

| | | |
|---|---|---|
| CN | 1747298 A | 3/2006 |
| CN | 1976190 A | 6/2007 |
| WO | 2004047260 A2 | 6/2004 |

\* cited by examiner

*Primary Examiner* — Matthew Nguyen

(57) ABSTRACT

A controller includes an input selector, multiple cores and a multiplexer. The multiplexer is operable for multiplexing control signals to multiple output channels to provide multiple output signals. Each output channel can output a respective output signal, and each output signal represents a cyclic rotation of the control signals. The input selector is operable for enabling the cores to operate in a standby state alternately to control a multiplexing sequence of the control signals.

22 Claims, 7 Drawing Sheets

CONTROLLERS, SYSTEMS AND METHODS FOR IMPLEMENTING MULTI-PHASE CONTROL

RELATED APPLICATIONS

This application claims priority to U.S. Provisional Application No. 61/324,838, titled "Multi-phase Controllers," filed on Apr. 16, 2010, which is hereby incorporated by reference in its entirety.

BACKGROUND

A controller can provide a control signal to a converter, which converts an input voltage to an output voltage based upon the control signal. These kinds of controllers may utilize a pulse width modulation (PWM) signal as the control signal and are referred to as PWM controllers. In a relatively heavy load application, e.g., a high-end microprocessor or Graphics Processor Unit (GPU) which requires a high load current, e.g., more than 30 Amperes (A), a multi-phase controller is widely employed, where two or more phases are used by the controller to meet the load requirement. However, the conventional multi-phase controller tends to share the heavy load unevenly, due to an unbalanced condition among the multiple phases. As a result of the unbalanced condition, the phases with heavier loads relative to others will suffer thermal stress. Contributors to the unbalanced condition range from mismatches in the control timing and layout of the controllers among the multiple phases to process variations in similar blocks of the multiple phases.

Typically, current balancing circuits are employed in the multi-phase controllers to share the load current evenly among the multiple phases. For current balancing, an additional current sensor is used to detect a current through a respective phase. The sensed phase current is fed to a correction circuit which adjusts the duty cycle of the respective phase in response to the unbalanced condition. However, the mismatch among the current sensors would still affect the balancing among the multiple phases. Further, the additional current sensors and correction circuits will increase the system cost, lower efficiency, and increase the die area of the multi-phase controllers.

SUMMARY

In one embodiment, a controller includes an input selector, multiple cores and a multiplexer. The multiple cores are operable for providing multiple control signals. The multiplexer is coupled to the cores and operable for multiplexing the control signals to multiple output channels to provide multiple output signals. Each output channel outputs a respective output signal, and each output signal represents a cyclic rotation of the control signals. The input selector is coupled to the cores and operable for enabling the cores to operate in a standby state alternately to control a multiplexing sequence of the control signals.

BRIEF DESCRIPTION OF THE DRAWINGS

Advantages of the present invention will be apparent from the following detailed description of embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments in accordance with the present disclosure provide controllers and methods for implementing a multi-phase control. The controller includes an input selector, multiple cores and a multiplexer. The multiple cores are operable for providing multiple control signals. The multiplexer is coupled to the cores and operable for multiplexing the control signals to multiple output channels to provide multiple output signals. Each output channel outputs a respective output signal, and each output signal represents a cyclic rotation of the control signals. The input selector is couple to the cores and operable for enabling the cores to operate in a standby state alternately to control a multiplexing sequence of the control signals.

Figure 1:
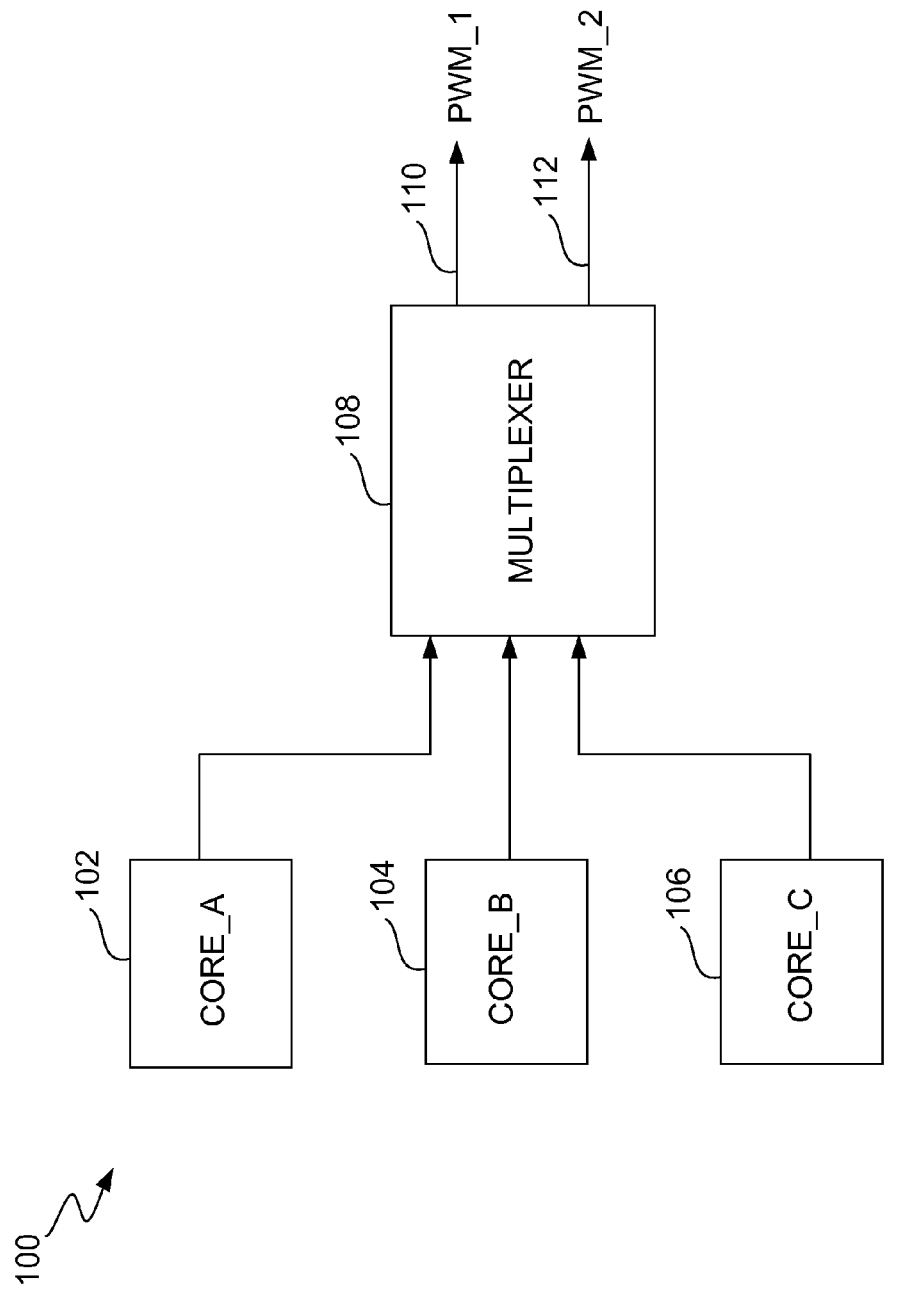
FIG. 1 is a block diagram of a multi-phase controller according to one embodiment of the present invention.

FIG. 1 illustrates a block diagram of a multi-phase controller 100 according to one embodiment of the present invention. The multi-phase controller 100 includes multiple cores and a multiplexer 108. Three cores 102, 104 and 106 are shown in the example of FIG. 1 for the purposes of illustration but not limitation. The multiple cores are coupled to the multiplexer 108 and each of the multiple cores provides a control signal to the multiplexer 108. The control signal can be, but is not limited to, a pulse signal, e.g., a pulse width modulation (PWM) signal. In one embodiment, the multiplexer 108 receives the control signals from the multiple cores and multiplexes the control signals to multiple output channels according to a multiplexing scheme. The multiplexing scheme involves determining a multiplexing sequence of the control signals to be multiplexed by the multiplexer 108. In one embodiment, the multiplexing sequence for the control signals is implemented by enabling the multiple cores to operate in a standby state in a cyclic rotation sequence. In one embodiment, when a multiplexing operation is requested from the multiplexer 108, a core in the standby state is triggered to provide a control signal to the multiplexer 108 for the requested multiplexing operation.

In the example of FIG. 1, the multiplexer 108 has two output channels 110 and 112. Per each multiplexing operation, the multiplexer 108 multiplexes the corresponding control signal to an output channel different from that used in the previous multiplexing operation. In other words, the output channels 110 and 112 receive the multiplexed control signals alternately to realize dual phase outputs. As a result, the output signal from each output channel represents a cyclic rotation of the control signals, and a sequence of the control signals appearing in each output channel is determined based upon the multiplexing sequence. In one embodiment, the output signals from the multi-phase controller 100 have the same waveform and different phases. Accordingly, each output signal demonstrates the same average of the control signals. As such, phase balance between the output channels is achieved without additional balancing circuitry in despite of mismatches and process variations in the multi-phase controller 100. Also, the system cost of the controller 100 is reduced accordingly, and efficiency is improved with removal of additional current sensors. In a similar manner, the multi-phase controller 100 can be extended to support more output channels and achieve phase balance among the multiple output channels.

Figure 2:
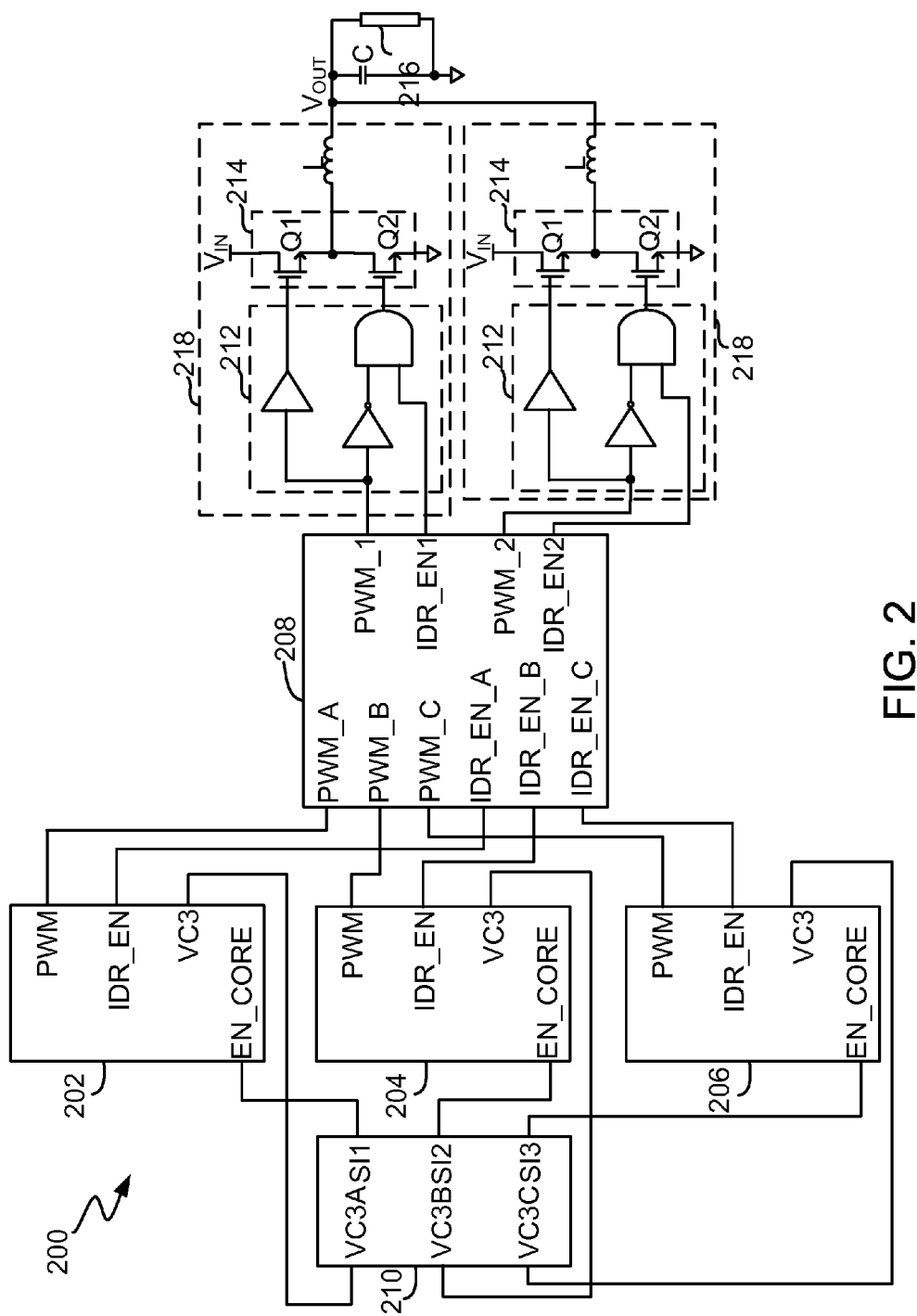
FIG. 2 is a schematic diagram of a multi-phase controller according to one embodiment of the present invention.

FIG. 2 illustrates a schematic diagram of a multi-phase controller 200 according to one embodiment of the present invention. The multi-phase controller 200 includes cores 202, 204 and 206, a multiplexer 208 and an input selector 210. In one embodiment, each core has the configuration as disclosed in U.S. Pat. No. 7,098,642, the teaching of which is also incorporated herein in its entirety by reference. The control signals from the corresponding cores 202, 204 and 206, e.g., PWM signals PWM_A, PWM_B and PWM_C, are sent to the multiplexer 208 according to a multiplexing sequence determined by the input selector 210. For illustrative purposes, the multiplexer 208 has two output channels for providing output signals, e.g., PWM signals PWM_1 and PWM_2. As discussed in relation to FIG. 1, phase balance between the output channels is achieved in despite of mismatches and process variations in the multi-phase controller 200.

In one embodiment, each output signal is provided to a converter 218 coupled to the corresponding output channel, thereby controlling an output voltage $V_{OUT}$ of the converter 218. In the example of FIG. 2, the converter 218, which includes a driver 212, a pair of switches 214 including a high side switch Q1 and a low side switch Q2, and an inductor L, converts an input voltage $V_{IN}$ to the output voltage $V_{OUT}$. In one embodiment, the converters coupled to the output channels share a capacitor C, across which the output voltage $V_{OUT}$ is generated based upon the output signals. The output voltage $V_{OUT}$ is provided to a load 216 coupled to the converters. In one embodiment, power delivered to the load 216 is controlled based upon the output signals. For example, a duty cycle of the PWM output signals controls the output voltage $V_{OUT}$ so as to achieve a suitable load current in operation, and the power delivered to the load 216 is regulated accordingly. Advantageously, due to the phase balance effect, the load current is shared evenly by the output channels.

In one embodiment, the input selector 210 is used to control the multiplexing sequence. For example, per each rotation cycle, the input selector 210 outputs an active enable si1 signal via SI1 pin when a rotation cycle starts. Core 202 receives the active enable si1 signal via EN_CORE pin and is accordingly set to a standby state. As discussed in relation to FIG. 1, when a multiplexing operation is requested from the multiplexer 208, the core 202 in the standby state is triggered to provide the control signal to the multiplexer 208 for the requested multiplexing operation. In the example of FIG. 2, the request is issued when a pulse wave is requested from the output channels of the multiplexer 208. In response to the request, the core 202 in the standby state is triggered to provide the PWM_A signal with a new pulse wave via PWM pin to PWM_A pin of the multiplexer 208. In one embodiment, the core 202 also provides an IDR_EN_A signal via IDR_EN pin to IDR_EN_A pin of the multiplexer 208. By way of example, the multiplexer 208 multiplexes the PWM_A and IDR_EN_A signals to a PWM_1 output channel which outputs the PWM_1 signal via PWM_1 pin and the IDR_EN1 signal via IDR_EN1 pin for the requested multiplexing operation. As a result of this multiplexing operation, the PWM_1 signal represents the PWM_A signal, and the IDR_EN1 signal represents the IDR_EN_A signal. The converter 218 coupled to the PWM_1 output channel regulates the output voltage $V_{OUT}$ based upon the PWM_1 and IDR_EN1 signals.

Moreover, core 202 outputs a token VC3A signal via VC3 pin in response to the active enable si1 signal. By way of example, the token VC3A signal is asserted at half a TON period of the PWM_A signal. In one embodiment, in a TON period of a PWM signal, the PWM signal is logic high. In a TOFF period of a PWM signal, the PWM signal is logic low. In another embodiment, the token VC3A signal is not necessarily asserted at half a TON period of a PWM signal and can be asserted at another time according to application requirements. The token VC3A signal is fed back to the input selector 210 via VC3A pin. In response to the token VC3A signal, the input selector 210 outputs an active enable si2 signal via SI2 pin and an inactive enable si1 signal via SI1 pin. Accordingly, core 204 is enabled to operate in the standby state in response to the active enable si2 signal, and core 202 exits from the standby state.

Likewise, when a next pulse wave is requested from the output channels of the multiplexer 208, a request is issued. In response to the request, core 204 in the standby state is triggered to provide the PWM_B signal with a new pulse wave via PWM pin to PWM_B pin of the multiplexer 208. In one embodiment, core 204 also provides an IDR_EN_B signal via IDR_EN pin to IDR_EN_B pin of the multiplexer 208. The multiplexer 208 multiplexes the PWM_B and IDR_EN_B signals to a PWM_2 output channel which outputs the PWM_2 signal via PWM_2 pin and the IDR_EN2 signal via IDR_EN2 pin for the requested multiplexing operation. As a result of this multiplexing operation, the PWM_2 signal represents the PWM_B signal, and the IDR_EN2 signal represents the IDR_EN_B signal. The converter 218 coupled to the PWM_2 output channel controls the output voltage $V_{OUT}$ based upon the PWM_2 and IDR_EN2 signals.

Moreover, core 204 outputs a token VC3B signal via VC3 pin in response to the active enable si2 signal. The token VC3B signal is fed back to the input selector 210 via VC3B pin. In response to the token VC3B signal, the input selector 210 outputs an active enable si3 signal via SI3 pin and an inactive enable si2 signal via SI2 pin. Accordingly, core 206 is enabled to operate in the standby state in response to the active enable si3 signal, and core 204 exits from the standby state. Core 206 in the standby state is triggered to provide the PWM_C signal with a new pulse wave via PWM pin to PWM_C pin of the multiplexer 208 in response to a next request from the multiplexer 208. In one embodiment, core 206 also provides an IDR_EN_C signal via IDR_EN pin to IDR_EN_C pin of the multiplexer 208. The multiplexer 208 multiplexes the PWM_C and IDR_EN_C signals to the PWM_1 output channel. As a result of this multiplexing operation, the PWM_1 signal represents the PWM_C signal, and the IDR_EN1 signal represents the IDR_EN_C signal.

Moreover, core 206 outputs a token VC3C signal via VC3 pin in response to the active enable si3 signal. Provided with the token VC3C signal, the input selector 210 outputs the active enable si1 signal via SI1 pin and an inactive enable si3 signal via SI3 pin. Accordingly, core 202 is enabled to operate in the standby state again in response to the active enable si1 signal, and core 206 exits from the standby state. At this point, the multi-phase controller 200 completes the first half of the rotation cycle. In the second half of the rotation cycle, cores 202, 204 and 206 repeat operations as discussed above with regard to the first half cycle, and the multiplexer 208 continues to multiplex the control signals to the output channels. As such, the output signal from each output channel represents a cyclic rotation of the control signals from the multiple cores, leading to phase balance among the multiple output channels without additional balancing circuitry.

Figure 3:
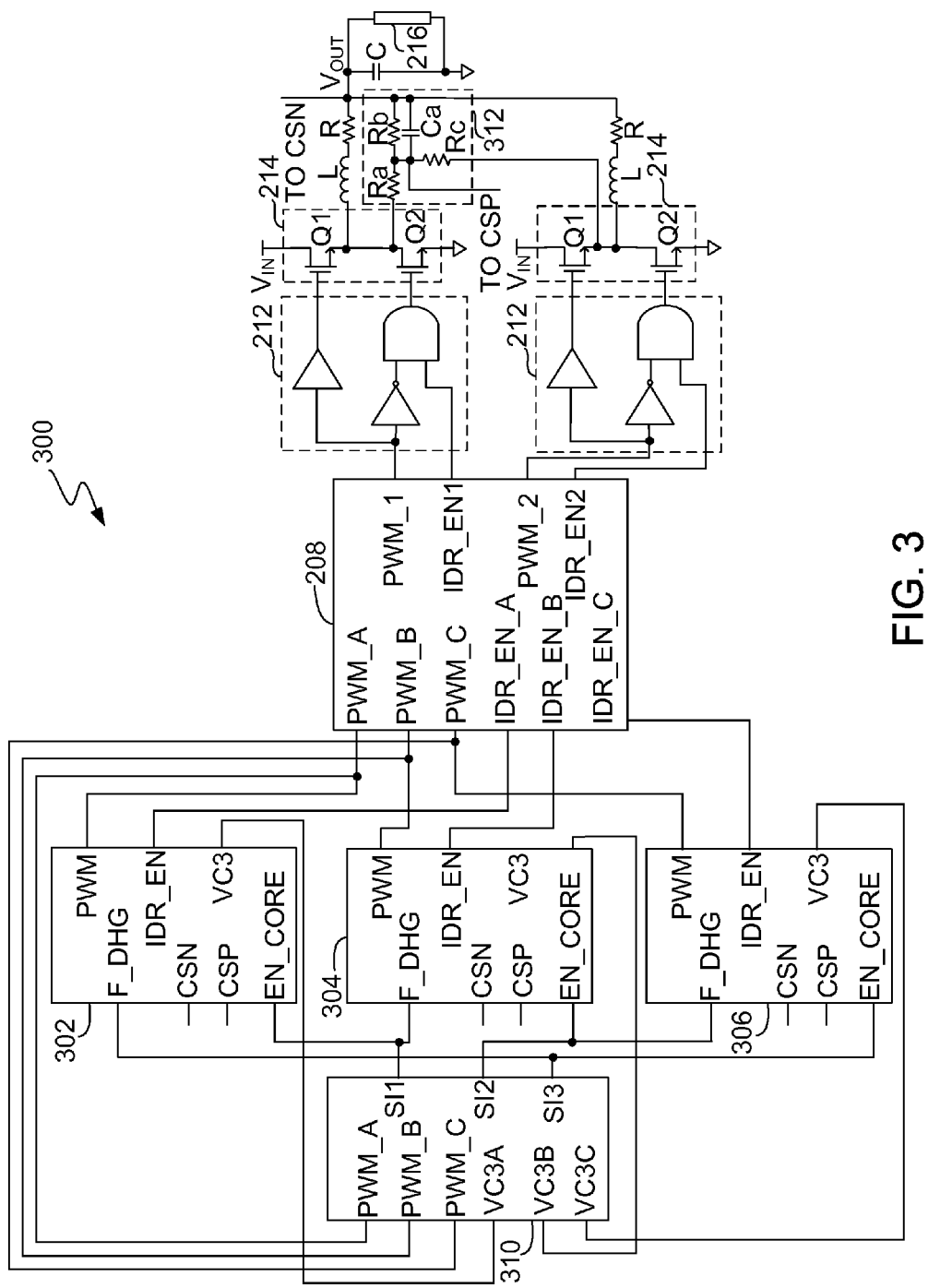
FIG. 3 is a schematic diagram of a multi-phase controller according to another embodiment of the present invention.

FIG. 3 illustrates a schematic diagram of a multi-phase controller 300 according to another embodiment of the present invention. Elements labeled the same as in FIG. 2 have similar functions. FIG. 3 is described in combination with FIG. 2. The controller 300 includes cores 302, 304 and 306, an input selector 310 and the multiplexer 208. In addition to the pins discussed in relation to the input selector 210 in FIG. 2, the input selector 310 further has pins PWM_A, PWM_B and PWM_C. Also, In addition to the pins discussed in relation to the cores in FIG. 2, each core in FIG. 3 further has a F_DHG pin, a CSN pin and a CSP pin. PWM_A pin of the input selector 310 is coupled to PWM pin of core 302 for receiving the PWM_A signal. PWM_B pin of the input selector 310 is coupled to PWM pin of core 304 for receiving the PWM_B signal. PWM_C pin of the input selector 310 is coupled to PWM pin of core 306 for receiving the PWM_C signal. SI1 pin of the input selector 310 is coupled to EN_CORE pin of core 302 and F_DHG pin of core 304. The SI2 pin of the input selector 310 is coupled to EN_CORE pin of core 304 and F_DHG pin of core 306. The SI3 pin of the input selector 310 is coupled to EN_CORE pin of core 306 and F_DHG pin of core 302. When each core receives an active enable signal via the EN_CORE pin, the core enters the standby state as discussed in relation to FIG. 2. When each core receives the active enable signal via the F_DHG pin, the core operates in a normal discharging mode or a fast discharging mode based upon the load 206. The CSN and CSP pins of each core receive CSP and CSPN feedback signals indicative of current information associated with the output channels. In response to the feedback signals, a regulation signal is generated to indicate whether a request for a pulse wave is issued from the output channels of the multiplexer 208.

In one embodiment, a resistor R is coupled in series with the inductor L in each converter. Alternatively, the illustrated resistor R refers to the parasitic direct current resistance (DCR) of the inductor L. Furthermore, a resistor network 312 is used to develop a voltage equivalent to the voltage across the resistor R, which represents the current information associated with the output channels, and to feed back the equivalent voltage to the multi-phase controller 300 via the CSN and CSP pins. In one embodiment, the resistor network 312 includes resistors Ra, Rb and Rc. The resistor Ra is coupled to the conjunction node of switches Q1 and Q2 in one converter, the resistor Rc is coupled to the conjunction node of switches Q1 and Q2 in another converter, and the resistor Rb is coupled to the capacitor C. The conjunction node of resistors Ra, Rb and Rc, which is referred to as a CSP node, is coupled to CSP pin of each core. The conjunction node of the resistor R and the capacitor C, which is referred to as a CSN node, is coupled to the CSN pin of each core. In one embodiment, the resistor network 312 also includes a capacitor Ca coupled in parallel with the resistor Rb. Based upon the CSP and CSN feedback signals, each core generates a regulation signal indicating whether a request for a new pulse wave is issued from the output channels of the multiplexer 208. That is, the regulation signal indicates whether a multiplexing operation is requested from the multiplexer 208. If the regulation signal indicates that the request is issued, a core in the standby state is triggered to provide the control signal to the multiplexer 208 for the requested multiplexing operation.

Figure 4:
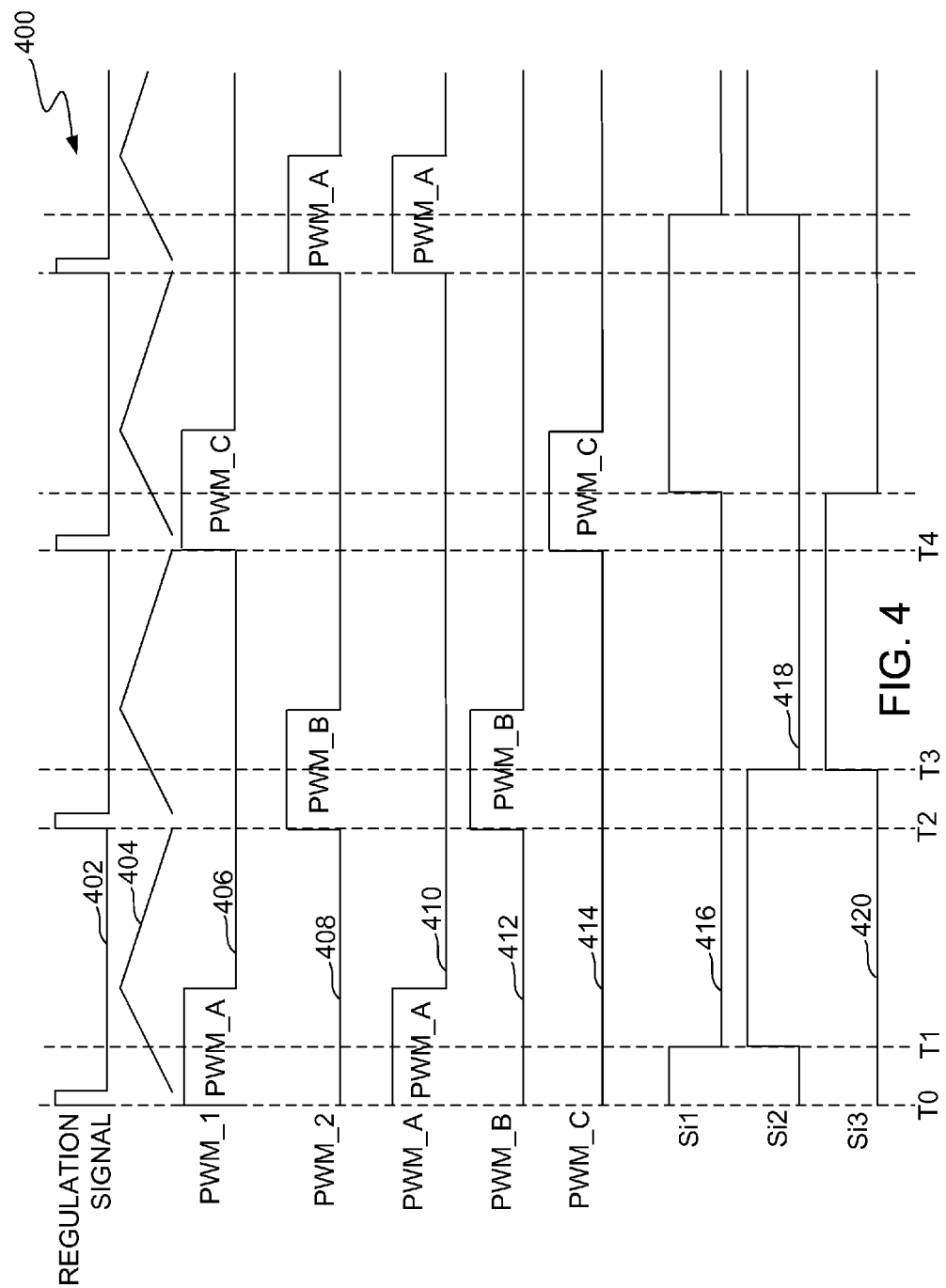
FIG. 4 a timing diagram of signals associated with a multi-phase controller according to one embodiment of the present invention.
Figure 5:
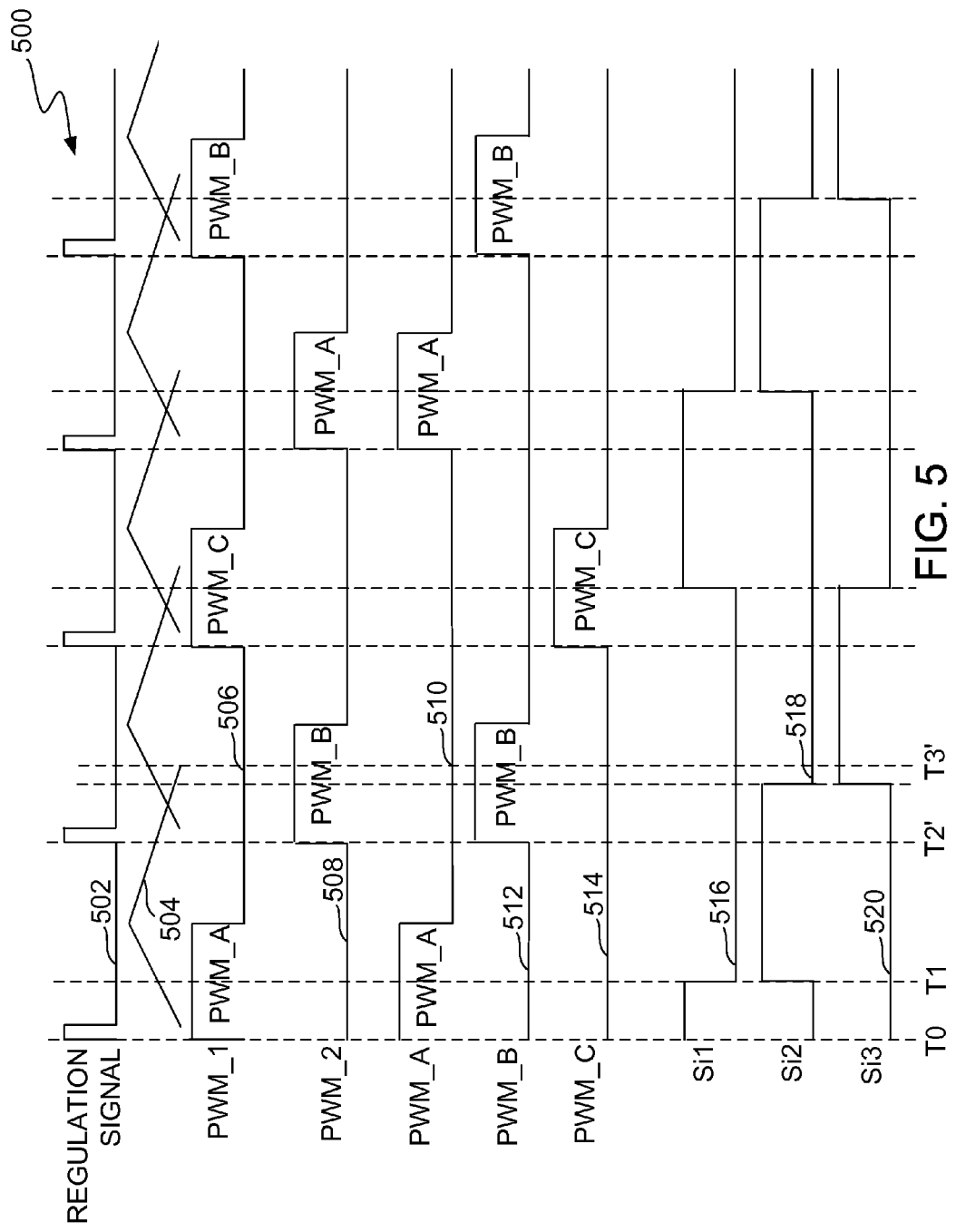
FIG. 5 is a timing diagram of signals associated with a multi-phase controller according to another embodiment of the present invention.
Figure 6:
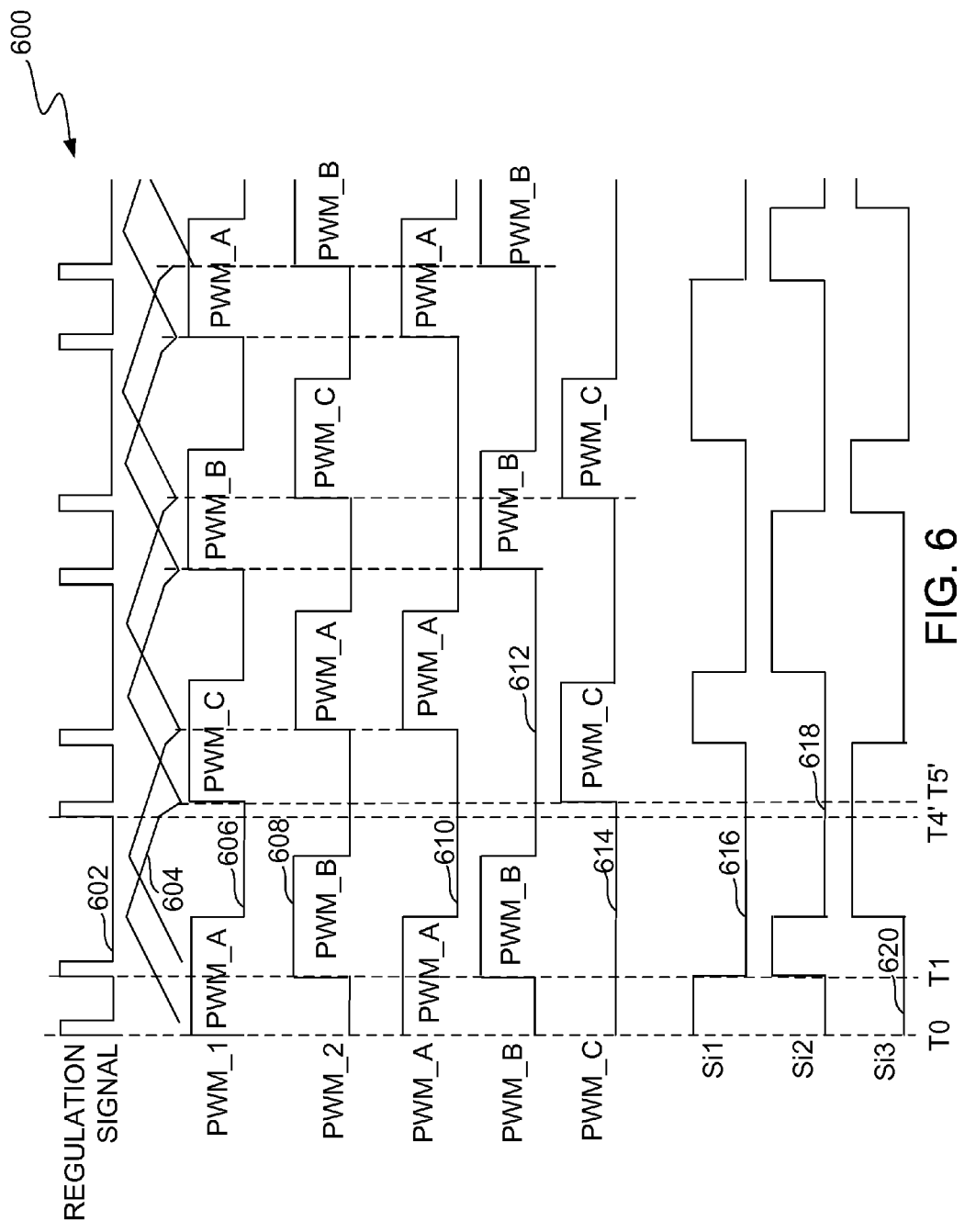
FIG. 6 is a timing diagram of signals associated with a multi-phase controller according to yet another embodiment of the present invention.

In one embodiment, by sensing the current information associated with the output channels, e.g., through the CSP and CSN pins, the multi-phase controller 300 selects different discharging modes for the cores so as to support various load conditions, which is described in relation to FIGS. 4-6. As such, performance of the multi-phase controller 300 is further improved.

FIG. 4 illustrates a timing diagram 400 of signals associated with the multi-phase controller 300 in FIG. 3. FIG. 4 is described in combination with FIG. 3. When the output voltage $V_{OUT}$ drives a relatively light load, the multiple cores operate in accordance with the timing diagram 400. A waveform 402 represents an example of the regulation signal indicating whether a request is issued from the multiplexer 208. A waveform 404 represents an example of the charging and discharging associated with an operating core which is performing a multiplexing operation. The charging associated with the operating core is conducted during the TON period of a PWM pulse, and the discharging associated with the operating core is conducted during the TOFF period of a PWM pulse. A waveform 406 represents an example of the PWM_1 signal. A waveform 408 represents an example of the PWM_2 signal. A waveform 410 represents an example of the PWM_A signal. A waveform 412 represents an example of the PWM_B signal. A waveform 414 represents an example of the PWM_C signal. A waveform 416 represents an example of the enable si1 signal. A waveform 418 represents an example of the enable si2 signal. A waveform 420 represents an example of the enable si3 signal.

Assuming the enable si1 signal is active (logic high) when a rotation cycle initiates at time T0, core 302 is set to the standby state in response to the active enable si1 signal. When the regulation signal indicates that a request for a new pulse wave is issued from the output channels of the multiplexer 208, e.g., at time T0, core 302 in the standby state is triggered to provide the PWM_A signal with a new pulse wave to the multiplexer 208. The multiplexer 208 multiplexes the PWM_A signal to the PWM_1 output channel. At time T1, e.g, at half of the TON period of the PWM_A pulse wave, the enable si1 signal becomes inactive (logic low) and the enable si2 signal becomes active (logic high). Accordingly, core 304 is set to the standby state and is triggered to provide the PWM_B signal with a new pulse wave to the multiplexer 208 when the regulation signal indicates the next request is issued, e.g., at time T2. In this instance, the PWM_B signal is multiplexed to the PWM_2 output channel to output the PWM_2 signal. As illustrated by waveform 404, operation of core 304 is triggered by the regulation signal at time T2, corresponding to the moment the waveform 404 reaches the valley to indicate completion of the discharging associated with core 302. Alternatively, operation of core 304 is triggered by the regulation signal during a period after time T2. In one embodiment, the period after time T2 is determined based upon the load condition. In other words, core 304 starts operation when or after operation of core 302 completes.

In a similar manner, at time T3, e.g., at half of the TON period of the PWM_B pulse wave, the enable si2 signal becomes inactive (logic low) and the enable si3 signal becomes active (logic high). Accordingly, core 306 is set to the standby state and is triggered to provide the PWM_C signal with a new pulse wave to the multiplexer 208 when the regulation signal indicates the next request is issued at time T4. In this instance, the PWM_C signal is multiplexed to the PWM_1 output channel to output the PWM_1 signal. Also, at or during a period after time T4, corresponding to the moment the waveform 404 reaches the valley to indicate completion of the discharging associated with core 304, operation of core 306 is triggered by the regulation signal. Thus, when the output voltage $V_{OUT}$ drives a relatively light load, the multiple cores operate in a cyclic rotation sequence and a single core is operating at any point in time.

Moreover, due to the relatively light load, a core in the standby state starts operation after the TON period of the PWM pulse associated with the previous operating core expires. That is, a core in the standby state starts operation after the waveform 404 reaches the peak to indicate completion of the charging associated with the previous operating core. In this instance, when an output channel requests a next pulse wave, the cycle of the previous pulse wave on the output channel has completed. For example, when the PWM_1 output channel requests the PWM_C pulse at time T4, the cycle of the PWM_A pulse has completed. As such, for such relatively light load applications, a core selects a normal discharging mode in response to the active enable signal received via F_DHG pin. For example, when core 306 is set to the standby state in response to the active enable si3 signal, core 302 operates in the normal discharging mode in response to the active enable si3 signal received via F_DHG pin.

FIG. 5 illustrates a timing diagram 500 of signals associated with the multi-phase controller 300 in FIG. 3. FIG. 5 is described in combination with FIG. 3. When the output voltage $V_{OUT}$ drives a medium load, the multiple cores operate in accordance with the timing diagram 500. A waveform 502 represents an example of the regulation signal indicating whether a request is issued from the multiplexer 208. A waveform 504 represents an example of the charging and discharging associated with the operating core. A waveform 506 represents an example of the PWM_1 signal. A waveform 508 represents an example of the PWM_2 signal. A waveform 510 represents an example of the PWM_A signal. A waveform 512 represents an example of the PWM_B signal. A waveform 514 represents an example of the PWM_C signal. A waveform 516 represents an example of the enable si1 signal. A waveform 518 represents an example of the enable si2 signal. A waveform 520 represents an example of the enable si3 signal. The timing diagram 500 is similar to the timing diagram 400, so that only the differences between the timing diagrams 400 and 500 are described in detail for brevity purposes.

Different from the timing diagram 400, waveform 504 has overlaps when operation is transitioned from one core to another. For example, assuming core 302 starts operation at time T0, operation of core 304 is triggered by the regulation signal at time T2' prior to time T3', corresponding to the moment the waveform 504 reaches the valley to indicate completion of the discharging associated with core 302. In other words, core 304 starts operation before operation of core 302 completes. As such, operations of the multiple cores overlap at the transitions. Moreover, due to the medium load, a core in the standby state starts operation after the TON period of the PWM pulse associated with the previous operating core expires. That is, a core in the standby state starts operation after the waveform 504 reaches the peak to indicate completion of the charging associated with the previous operating core. Similar to the operation discussed in relation to FIG. 4, when an output channel requests a next pulse wave, the cycle of the previous pulse wave on the output channel has completed. As such, for such medium load applications, a core selects a normal discharging mode in response to the active enable signal received via F_DHG pin.

FIG. 6 illustrates a timing diagram 600 of signals associated with the multi-phase controller 300 in FIG. 3. FIG. 6 is described in combination with FIG. 3. When the output voltage $V_{OUT}$ drives a relatively heavy load, the multiple cores operate in accordance with the timing diagram 600. A waveform 602 represents an example of the regulation signal indicating whether a request is issued. A waveform 604 represents an example of the charging and discharging associated with the operating core. A waveform 606 represents an example of the PWM_1 signal. A waveform 608 represents an example of the PWM_2 signal. A waveform 610 represents an example of the PWM_A signal. A waveform 612 represents an example of the PWM_B signal. A waveform 614 represents an example of the PWM_C signal. A waveform 616 represents an example of the enable si1 signal. A waveform 618 represents an example of the enable si2 signal. A waveform 620 represents an example of the enable si3 signal. The timing diagram 600 is similar to the timing diagrams 400 and 500, so that only the differences among the timing diagrams 400, 500 and 600 are described in detail for brevity purposes.

As opposed to the timing diagrams 400 and 500, the regulation signal according to the waveform 602 triggers core 304 to provide the PWM_B signal with a new pulse wave to the multiplexer 208 immediately after half of the TON period of the PWM_A pulse expires due to the relatively heavy load. At half of the TON period of the PWM_B pulse, the enable si2 signal becomes inactive (logic low) and the enable si3 signal becomes active (logic high) to standby core 306. When the regulation signal indicates the pulse wave is requested from the PWM_1 channel, e.g., at time T4', the cycle of the previous PWM_A pulse wave on the PWM_1 channel has not completed. In this instance, core 302 is enabled to operate in the fast discharging mode due to the active enable si3 signal received via the F_DHG pin. In the fast discharging mode, the discharging associated with core 302 completes in a faster speed relative to the normal discharging mode. Also, in the fast discharging mode, core 306 is prevented from providing the PWM_C signal to the multiplexer 208 until time T5', the moment the waveform 604 reaches the valley to indicate completion of the discharging associated with core 302, that is, operation of core 302 has completed.

In a similar manner, at half of the TON period of the PWM_C pulse, the enable si3 signal becomes inactive (logic low) and the enable si1 signal becomes active (logic high) to standby core 302. When the regulation signal indicates the next pulse wave is requested, core 304 is enabled to operate in the fast discharging mode. When operation of core 304 has completed, core 302 begins operation. As such, when the output voltage $V_{OUT}$ drives a relatively heavy load, more than one core operates simultaneously at any point in time, and when operation of one of the operating cores completes, operation of a next core starts.

In summary, as demonstrated by FIGS. 4-6, the multi-phase controller 300 selects different discharging modes to support various load conditions, thereby achieving a more reliable performance.

Figure 7:
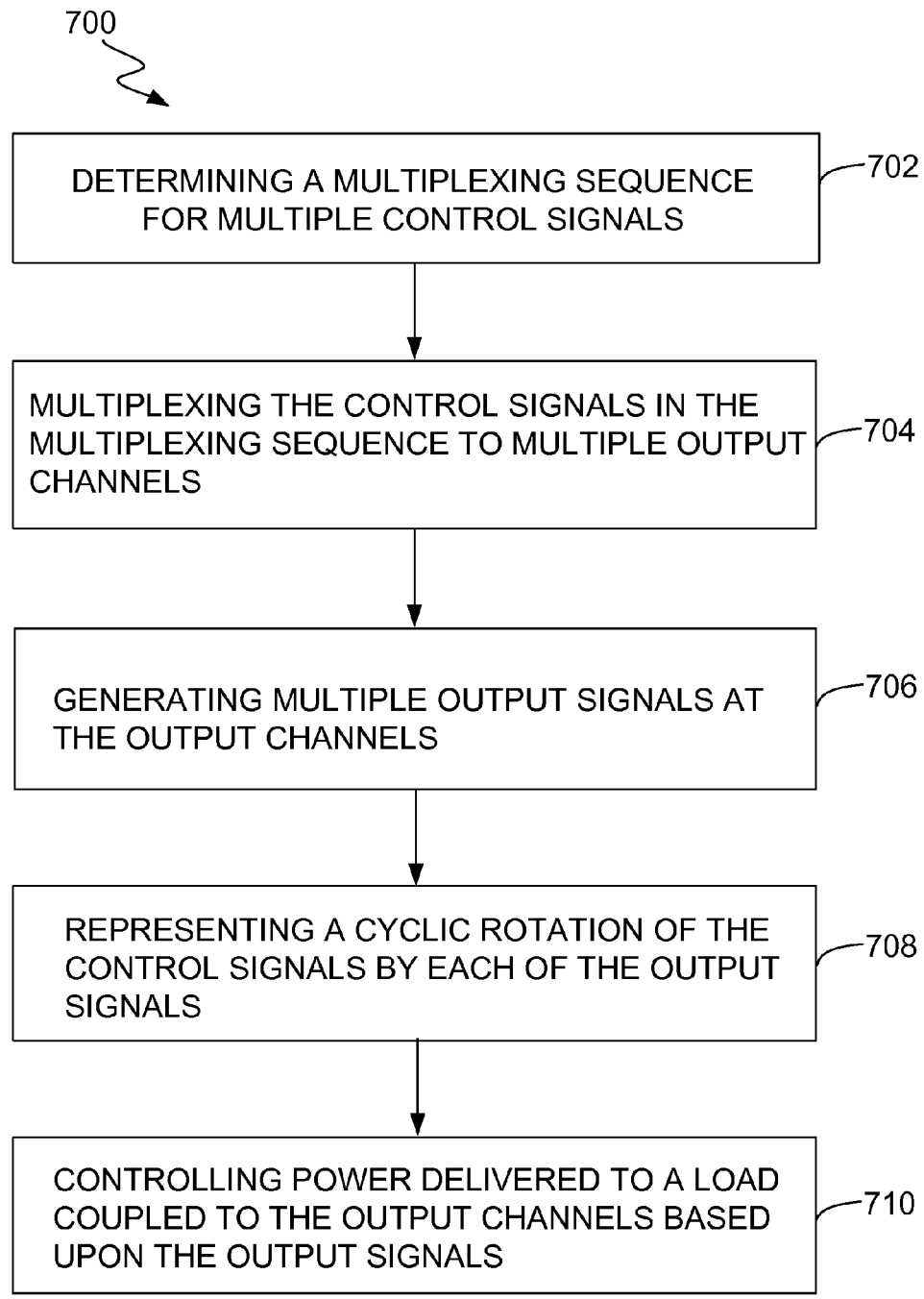
FIG. 7 is a flowchart of a method for implementing a multi-phase control according to one embodiment of the present invention.

FIG. 7 illustrates a flowchart 700 of a method for implementing multi-phase control according to one embodiment of the present invention. Although specific steps are disclosed in FIG. 7, such steps are examples. That is, the present invention is well suited to performing various other steps or variations of the steps recited in FIG. 7. FIG. 7 is described in combination with FIG. 3.

In block 702, a multiplexing sequence for multiple control signals is determined. In one embodiment, the input selector 310 determines a multiplexing sequence for control signals PWM_A, PWM_B and PWM_C, e.g., by enabling cores 302, 304 and 306 to operate in the standby state in a cyclic rotation sequence. In one embodiment, a core in the standby state is triggered to provide a control signal to the multiplexer 208 for a requested multiplexing operation.

In block 704, the control signals are multiplexed to multiple output channels in the multiplexing sequence. In one embodiment, the multiplexer 208 multiplexes the control signals PWM_A, PWM_B and PWM_C to the output channels PWM_1 and PWM_2 in the multiplexing sequence determined by the input selector 310.

In block 706, multiple output signals are generated at the output channels. In one embodiment, the output signals PWM_1 and IDR_EN1 are generated at the output channel PWM_1, and the output signals PWM_2 and IDR_EN2 are generated at the output channels PWM_2.

In block 708, each output signal represents a cyclic rotation of the control signals. In one embodiment, each of the PWM_1 and PWM_2 signals represents a cyclic rotation of the PWM_A, PWM_B and PWM_C signals.

In block 710, power delivered to a load is controlled based upon the output signals. In one embodiment, power delivered to a load 216 is controlled based upon the output signals. For example, a duty cycle of the PWM output signals controls the output voltage $V_{OUT}$ so as to achieve a suitable load current in operation. Accordingly, power delivered to the load 216 is adjusted.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A controller comprising:
   a plurality of cores operable for providing a plurality of control signals;
   a multiplexer coupled to said cores and operable for multiplexing said control signals to a plurality of output channels to provide a plurality of output signals, wherein said output channels each outputs a respective output signal, and wherein said respective output signal represents a cyclic rotation of said control signals; and
   an input selector coupled to said cores and operable for controlling a multiplexing sequence of said control signals to be multiplexed by said multiplexer, and operable for enabling a second core of said cores to operate in a standby state in response to a token signal that is output from a first core of said cores subsequent to said first core providing a corresponding control signal.

2. The controller as claimed in claim 1, wherein at least two of said output signals have the same waveform and different phases.

3. The controller as claimed in claim 1, wherein said control signals comprise a pulse signal, and wherein said multiplexer multiplexes a control signal from said second core in said standby state to one of said output channels when a pulse wave is requested from said output channel.

4. The controller as claimed in claim 1, further comprising:
   a plurality of converters coupled to said output channels and operable for providing an output voltage based upon said output signals.

5. The controller as claimed in claim 1, wherein said cores receive a feedback signal indicative of current information associated with said output channels and generates a regulation signal based upon said feedback signal.

6. The controller as claimed in claim 5, wherein said second core in said standby state is triggered to provide a respective control signal to said multiplexer for a requested multiplexing operation in response to said regulation signal.

7. The controller as claimed in claim 5, further comprising:
   a resistor network coupled to said output channels and operable for generating said feedback signal.

8. The controller as claimed in claim 1, wherein said input selector further comprises:
   a first plurality of pins coupled to said cores and operable for receiving a plurality of token signals from said cores; and
   a second plurality of pins coupled to said cores and operable for providing a plurality of enable signals to said cores in response to said token signals.

9. The controller as claimed in claim 8, wherein said first core and a third core of said cores receive an enable signal from said enable signals, wherein said first core selects a discharging mode from a normal discharging mode and a fast discharging mode based upon a load coupled to said controller in response to said enable signal, and wherein said third core is enabled to operate in said standby state in response to said enable signal.

10. The controller as claimed in claim 9, wherein said third core is triggered to provide a respective control signal to said multiplexer for a requested multiplexing operation after a discharging period of said first core completes.

11. A method of implementing a multi-phase control comprising:
   determining a multiplexing sequence for a plurality of control signals provided by a plurality of cores;
   multiplexing said control signals in said multiplexing sequence to a plurality of output channels;
   generating a plurality of output signals at said output channels;
   representing a cyclic rotation of said control signals by each of said output signals;
   controlling a current through a load coupled to said output channels based upon said output signals,
   outputting a token signal at a first core of a plurality of cores subsequent to providing of a corresponding control signal from said first core; and
   enabling a second core of said cores to operate in a standby mode in response to said token signal.

12. The method as claimed in claim 11, wherein at least two of said output signals have the same waveform and different phases.

13. The method as claimed in claim 11, further comprising:
   generating a feedback signal indicative of current information associated with said output channels; and
   generating a regulation signal based upon said feedback signal.

14. The method as claimed in claim 13, further comprising:
   indicating a request for a multiplexing operation by said regulation signal; and
   triggering said second core in said standby mode to provide a respective control signal for said multiplexing operation in response to said regulation signal.

15. The method as claimed in claim 11, further comprising:
   providing an enable signal to said first core and a third core;

selecting a discharging mode for said first core from a normal discharging mode and a fast discharging mode based upon said load in response to said enable signal; and enabling said third core to operate in a standby mode in response to said enable signal.

16. The method as claimed in claim 15, further comprising:

completing a discharging period of said first core; and triggering said third core to provide a respective control signal for a multiplexing operation in response to said completing.

17. A system comprising:

a multi-phase controller, comprising:

a plurality of cores operable for providing a plurality of control signals;

a plurality of output channels for providing a plurality of output signals, wherein each of said output channels outputs a respective output signal, and wherein said respective output signal represents a cyclic rotation of said control signals; and a multiplexer coupled to said cores and said output channels, and operable for multiplexing said control signals to said output channels to generate said output signals;

an input selector coupled to said multi-phase controller and operable for controlling a sequence of said control signals appearing in each of said output channels, and operable for enabling a second core of said cores to operate in a standby state in response to a token signal that is output from a first core of said cores subsequent to said first core providing a corresponding control signal; and a plurality of converters coupled to said multi-phase controller and operable for providing an output voltage based upon said output signals.

18. The system as claimed in claim 17, further comprising:

a resistor network coupled to said output channels and operable for generating a feedback signal indicative of current information associated with said output channels.

19. The system as claimed in claim 18, wherein said output signal comprises a pulse width modulation signal, and wherein said multi-phase controller generates a regulation signal based upon said feedback signal to indicate whether a pulse wave is requested from said output channels.

20. The system as claimed in claim 17, wherein at least two of said output signals have the same waveform and different phases.

21. The system as claimed in claim 17, wherein said input selector further comprises:

a first plurality of pins coupled to said cores and operable for receiving a plurality of token signals from said cores; and a second plurality of pins coupled to said cores and operable for providing a plurality of enable signals to said cores in response to said token signals.

22. The system as claimed in claim 21, wherein said first core and a third core of said cores receive an enable signal of said enable signals, wherein said first core selects a discharging mode from a normal discharging mode and a fast discharging mode based upon a load coupled to said controller in response to said enable signal, and wherein said third core is enabled to operate in said standby state in response to said enable signal.

* * * * *